United States Patent [19]

Sergent

[11] 4,293,859
[45] Oct. 6, 1981

[54] TRAFFIC RADAR UNIT

[75] Inventor: Edward W. Sergent, Chanute, Kans.

[73] Assignee: M. P. H. Industries, Inc., Chanute, Kans.

[21] Appl. No.: 75,425

[22] Filed: Sep. 14, 1979

[51] Int. Cl.³ .............................................. H01Q 1/32
[52] U.S. Cl. .................................. 343/702; 343/714; 343/781 R
[58] Field of Search ................... 343/8, 702, 713, 714, 343/781 R; 455/89, 90, 99, 128, 129

[56] References Cited

U.S. PATENT DOCUMENTS 3,120,640  2/1964  Midlock et al. ........................ 343/8
4,210,357  7/1980  Adachi ................................. 343/713

Primary Examiner—Eli Lieberman
Attorney, Agent, or Firm—D. A. N. Chase; Michael Yakimo, Jr.

[57] ABSTRACT

A one-piece traffic radar unit has a housing containing both the transceiver and signal processing circuitry and the directional antenna of the radar system. A bracket plate extends from the top portion of the housing and overlies the dashboard of the patrol vehicle to mount the unit therein with the housing depending from the bracket plate in front of the dashboard, thereby leaving the driver's view through the windshield unobstructed. The antenna is of the conical horn type and is vertically disposed to beam the transmitted signal up through the housing to a rotary reflector mounted on the top of the housing. The reflector is rotatable about a vertical axis and permits the operator to aim the beam in any horizontal direction through the windshield or a window of the vehicle. A special safety mount for the reflector provides for 360° rotation and also permits the reflector to break away from the housing on impact. The housing is specially shaped in that the front panel thereof, containing the controls and readout, is positioned obliquely with respect to the fore-and-aft axis of the vehicle to face the panel generally toward the driver and provide a convenient reading angle.

12 Claims, 9 Drawing Figures 4,293,859

TRAFFIC RADAR UNIT

CROSS-REFERENCES

See my co-pending design application, Ser. No. 066,025, filed Aug. 13, 1979.

This invention relates to improvements in traffic radar equipment and, in particular, to a one-piece radar unit that may be quickly installed in a patrol vehicle and which has advantages from the standpoints of both installation and operator convenience and efficiency.

The application of Doppler radar principles to traffic control and vehicle speed determination is well known, and in recent years Doppler radar units have enjoyed widespread use by police departments and other law enforcement agencies. More advanced traffic radar devices are of the so-called "moving radar" type which permits the unit to be operated while the patrol vehicle is moving, typically in one lane of a highway while surveying oncoming traffic in the other lane. Normally, such units also have a stationary mode in which the patrol vehicle is parked at a fixed location, in which case the radar antenna may be aimed in any direction, such as to the rear or side, in addition to the front.

Conventional traffic radar devices are typically of two types. One is a two-piece apparatus in which the antenna is separate from the housing containing the microwave transceiver and signal processing circuitry. The transceiver-processor unit may be dashboard mounted, and is provided with a control panel that includes the system readout. The antenna unit may be mounted on the dashboard on a swivel mount to permit the antenna to be aimed in the desired direction.

The second type is a one-piece unit which is gun-shaped so that it may be handheld. In moving radar applications the unit is suitably mounted behind the windshield on the dashboard of the vehicle in order to free the driver's hands. Oftentimes, the gun design places the readout at a poor viewing angle from the driver's seat.

In either of the two types briefly discussed above, the top surface of the dashboard is primarily relied upon as a means of supporting the units. Being next to the windshield, the driver's view is inherently obstructed to some extent. Furthermore, with the current emphasis on reduction of the size of automobiles, the size of the dashboard is being reduced and the horizontal mounting area previously presented behind the dashboard is no longer available as a supporting surface.

It is, therefore, an important object of the present invention to provide a traffic radar unit which does not obstruct the driver's forward view, and which has installational and operational advantages not found in the previous types of units discussed above.

Another important object of this invention is to provide a one-piece traffic radar unit which may be quickly installed in a patrol vehicle and which allows for easy car-to-car transfer, and yet has the operational advantages of conventional two-piece units.

Still another object of the invention is to provide a one-piece traffic radar unit as aforesaid in which the housing containing both the circuitry and the antenna is mounted in front of the dashboard rather than on top.

Yet another important object of the present invention is to provide a traffic radar unit as set forth in the immediately preceding object, which is designed with the antenna located in the housing in front of the dashboard but which is nonetheless capable of directing the radar beam in any direction through the windshield or windows of the vehicle.

Furthermore, it is an important object of the invention to provide a traffic radar unit in which the radar beam may be positively aimed when the unit is operated in the moving mode.

It is still another important object of the invention to provide a traffic radar unit as aforesaid that utilizes a reflector to direct the radar beam toward a target vehicle, so as to eliminate the need to position the entire antenna assembly at an elevation aligned with the windshield and windows of the patrol vehicle.

A specific object is to provide such a reflector that will break away from the unit under impact for the safety of the driver and any occupants of the vehicle.

Additionally, it is an important object of the invention to provide a one-piece traffic radar unit which is mounted in front of the dashboard but which presents the readout at a convenient viewing angle for the driver.

DETAILED DESCRIPTION

Figure 1:
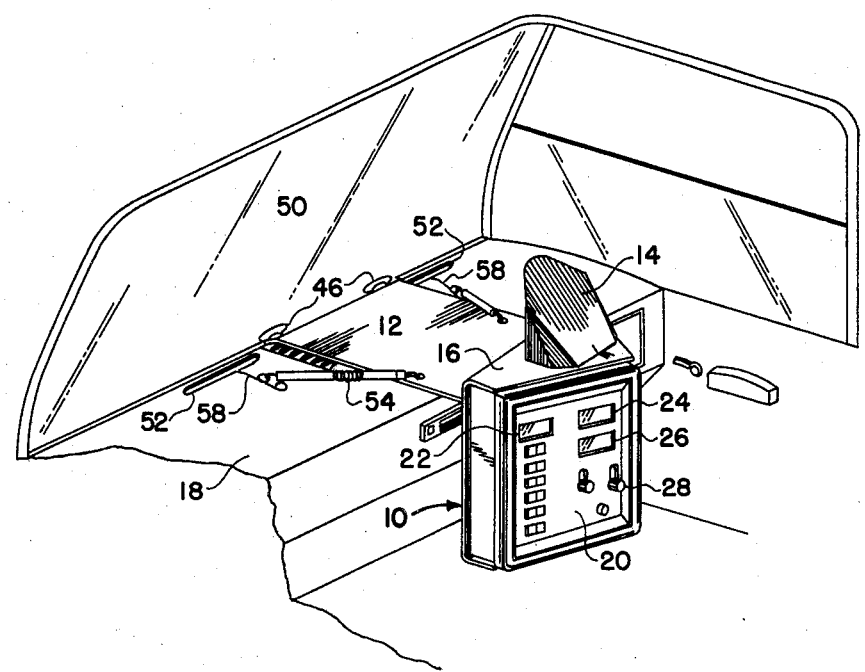
FIG. 1 is a perspective view showing a portion of the interior of an automobile in which the unit of the present invention is installed.

In FIG. 1 the one-piece unit of the present invention is shown installed in a patrol vehicle for use in either moving radar applications or in the stationary mode where the vehicle would be parked at a fixed location. The unit has, as its major components, an irregularly shaped housing 10, a horizontally disposed bracket plate 12 in the nature of a mounting boom which is attached to the top portion of the housing 10, and a rotary reflector 14 mounted on the top wall 16 of the housing 10. The bracket plate 12 overlies the dashboard 18 and is located approximately in the center thereof or somewhat to the right of center (toward the passenger side) as illustrated.

Figure 2:
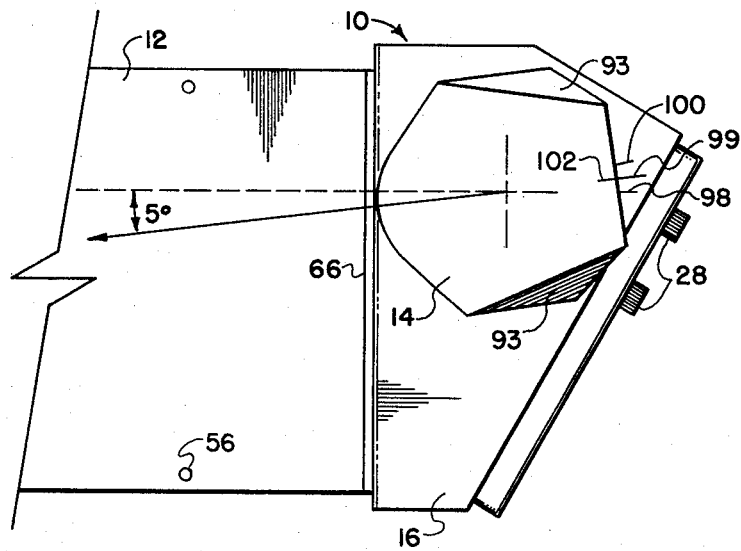
FIG. 2 is a partial, top plan view of the unit showing the reflector rotated five degrees from center alignment to illustrate the average position thereof in moving radar applications where the opposite lane of a highway is under surveillance.
Figure 4:
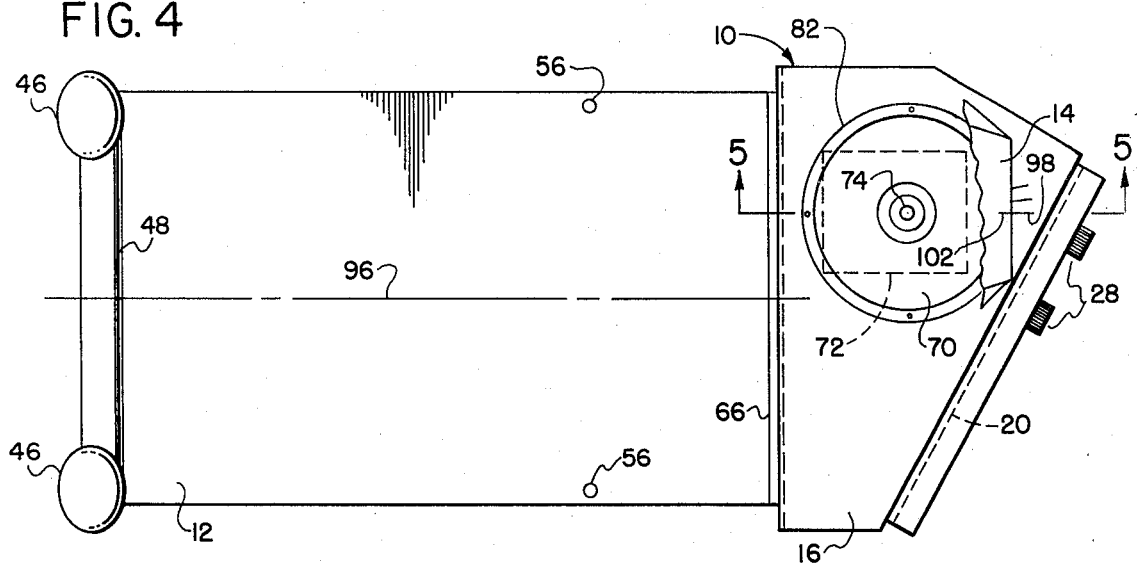
FIG. 4 is a top plan view of the unit with the reflector shown in the center position and broken away to reveal details of construction.

As may be appreciated from viewing FIGS. 1, 2 and 4, the housing 10 has a front panel 20 provided with the controls for the radar apparatus and the system readout.

As will be discussed more fully hereinafter, the front panel 20 is positioned obliquely with respect to the fore-and-aft axis of the vehicle so that it faces generally toward the driver to provide a convenient viewing angle. The readout includes the speed of the patrol vehicle presented by a digital patrol display 22, the speed of the target vehicle presented by the upper right digital display 24, and a target lock display 26 beneath the target display 24 which indicates the locked-in reading of the speed of a violator. The two knobs 28 are used by the operator to select the two digits of the violation speed, and the other controls illustrated on the panel 20 are various function switches of a standard nature used to control the operation of the apparatus.

Figure 3:
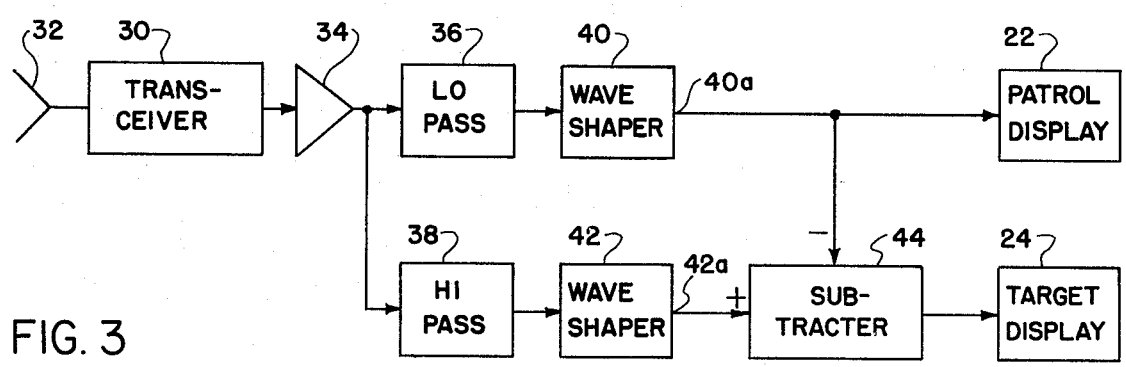
FIG. 3 is a simplified block diagram of a traffic radar utilized in moving radar applications.

FIG. 3 illustrates the basic stages of a digital traffic radar device having moving radar capability. A microwave transceiver 30 is coupled with a directional antenna 32 and produces a microwave signal which is directed by the antenna 32 toward a target vehicle or in a direction to intercept the path of such vehicle. A typical frequency of transmission is 10,525 MHz. The antenna 32 receives reflected signals in the conventional manner and the same are suitably amplified by an amplifier stage 34 and fed to a low pass filter 36 and a high pass filter 38. The Doppler return signal from a target vehicle is a composite signal having relatively high and low frequency components which, in typical enforcement applications, represent the closing speed of the target vehicle and the speed of the patrol car respectively. These two components are separately processed by wave shapers 40 and 42 to provide a low frequency, logic conditioned speed signal at the output 40a of wave shaper 40, and a high frequency, logic conditioned speed signal at the output 42a of wave shaper 42. The low frequency speed signal from wave shaper output 40a is fed to the patrol display 22 and to a subtracter 44. The high frequency speed signal from the wave shaper output 42a is also fed to an input of the subtracter 44. Accordingly, the output of the subtracter is a difference frequency indicative of the speed of the target vehicle obtained by subtracting the patrol car speed from the closing speed, and is fed to the target speed display 24. In the stationary mode, the patrol display 22 is inoperative and the subtracter 44 is bypassed. It should also be understood that the radar device will typically include validation circuitry not illustrated in FIG. 3 for discriminating between a true incoming Doppler return signal and random noise.

Figure 8:
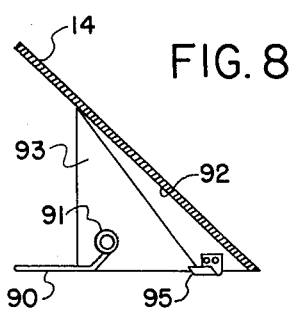
FIG. 8 is a vertical sectional view of the reflector only, taken along line 5—5 of FIG. 4.

In FIGS. 1, 4 and 8 it may be seen that the bracket plate 12 is held in overlying relationship with the top surface of the dashboard 18 by a pair of suction cups 46 mounted at the corners of the bracket plate 12 remote from the housing 10. The bracket plate 12 is of elongated, rectangular configuration and is planar except at such remote end where a transverse line of bend 48 defines the beginning of an angled tip to which the suction cups 46 are secured. As may be appreciated in FIG. 1, this angle imparted to the remote end approximates the contour of the windshield 50 of the vehicle so as to press the suction cups 46 flatly thereagainst. The defroster vents 52 at the bottom of the windshield are advantageously utilized to complete the installation, in that a tie extends from each edge of the bracket plate 12 to a corresponding vent 52. Each of the ties comprises a coil spring 54 encased in a plastic sleeve to preclude abrasion and extending from an anchor hole 56 in plate 12 to a hook 58 (FIG. 8) which is received by the defroster opening 52. As shown in FIG. 8, each of the hooks 58 is formed from wire stock and has a finger grip 60 on the end of the shank, such shank terminating in a bent tip portion 62 which is suitably shaped to be received by the vent opening 52. A loop formed at the center of the shank presents an eye 64 through which the end of the spring 54 is connected.

From the foregoing, it may be appreciated that the housing 10 is located entirely in front of the dashboard 18. As seen by a comparison of FIGS. 4 and 5, the bracket plate 12 at its connection to the housing 10 is provided with a short upstanding flange 66 which terminates essentially in the plane of the top wall 16 of the housing 10. Accordingly, the major portion of the housing 10 depends from the plate 12 in front of the dash and no part thereof is at an elevation to restrict the driver's forward view.

The directional antenna 32 employed in the present invention is a circularly polarized conical antenna having a vertically disposed horn 70 extending upwardly from a turnstile assembly 72 within which the antenna post 74 is disposed along the vertical axis 76 of the horn 70. It may be appreciated in FIG. 5 that the antenna 32 occupies substantially the entire vertical space within housing 10, as the turnstile assembly 72 is supported on the baseplate 78 of housing 10 by short mounting legs 79. The transceiver and processor circuitry is not illustrated in the views of the housing, it being understood that it is inside the housing 10 and that the transceiver 30 is connected to the antenna 32 in the usual manner. It may be appreciated that containing the antenna 32 within the housing 10, and locating the housing as illustrated in front of the dashboard 18 provides a very low profile unit in that only the relatively small reflector 14 projects upwardly at the windshield level.

Figure 7:
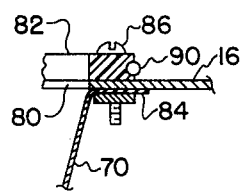
FIG. 7 is a fragmentary, cross-sectional view taken along line 7—7 of FIG. 6.
Figure 6:
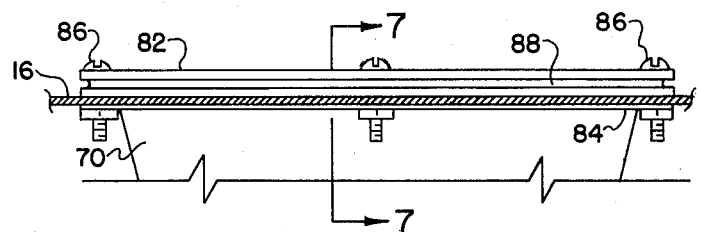
FIG. 6 is a detail showing the top wall of the housing in vertical cross-section and the upper end of the horn and the mounting ring for the reflector in elevation, the reflector being removed.
Figure 5:
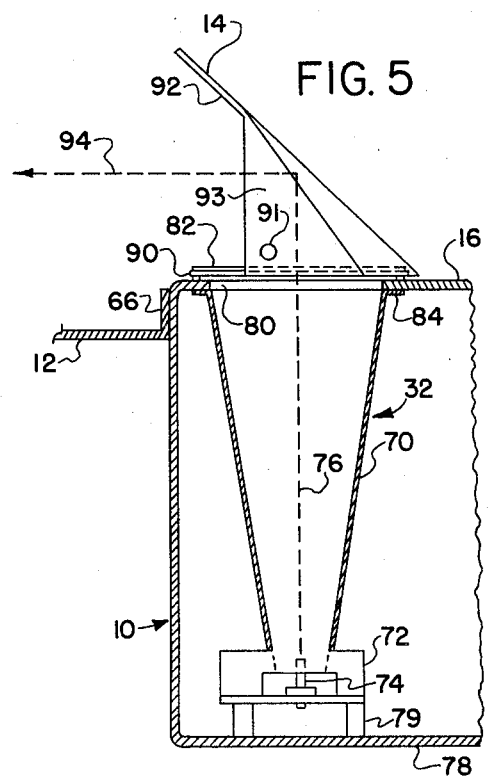
FIG. 5 is a simplified, vertical sectional view taken substantially along line 5—5 of FIG. 4, with certain parts being shown in elevation or broken away for clarity.
Figure 9:
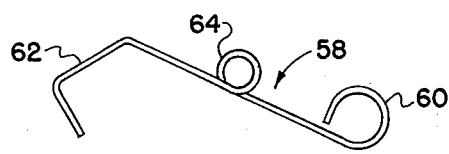
FIG. 9 is a detail showing one of the hooks used to tie the bracket plate to a defroster opening.

The axis 76 of the conical horn 70 may also be viewed as the central ray of the transmitted radar beam that is directed upwardly to the reflector 14 as illustrated in FIG. 5. The top wall 16 of the housing 10 has a circular opening 80 therein registering with the upper end of the horn 70, and a mounting ring 82 on top wall 16 is concentric with the opening 80 and has an internal diameter equal to the diameter of the opening 80. As best shown in FIGS. 6 and 7, the upper end of the horn 70 is provided with a radial flange 84 engaging the underside of top wall 16 at the margin of opening 80. Four nut and bolt assemblies 86 secure the parts together with the portion of top wall 16 at the margin of opening 80 sandwiched between the flange 84 and the ring 82.

The mounting ring 82 has a circumferential groove 88 therein which receives a wirelike, generally semi-circular band or loop 90 extending from the reflector 14 and attached at its ends to the bottom edge of the reflector by a pair of fasteners 91. The reflector 14 may be formed from a metal plate and has a planar reflecting undersurface 92 bounded by a pair of side skirts 93 to present a hood-shaped configuration. The reflecting surface 92 is inclined at a 45 degree angle with respect to the horn axis 76, which is also the axis of rotation of the reflector 14. The result is that the initially vertically upwardly directed radar beam is redirected at a right angle by the reflecting surface 92 in a horizontal direction as indicated by the broken line and arrow 94 in FIG. 5. A pair of tabs 95 (one is visible in FIG. 8) on respective skirts 93 are also received within groove 88; therefore, the engagement of the band 90 and tabs 95 with the ring 82 within the groove 88 thereof provides a continuous track for rotation of the reflector 14 about axis 76 through 360 degrees as the band 90 and tabs 95 slide in the groove 88, so that the redirected horizontal beam may be aimed through the windshield 50 or a window of the patrol car as desired by the operator.

Referring to FIG. 4, the center line denoted 96 represents the longitudinal axis of the bracket plate or boom 12 and is shown for the purpose of emphasizing the orientation of the front panel 20 of the housing 10 which, as viewed in plan, has an irregular five-sided configuration. Such longitudinal axis 96 extends fore and aft with respect to the patrol car in which the unit is installed, as may be readily appreciated from the foregoing description and from FIG. 1 where the unit is seen from the driver's side of the vehicle looking in the general direction of the passenger side of the front seat. The front panel 20, however, lies in an upright plane extending horizontally obliquely with respect to the longitudinal axis 96 so that the panel faces generally toward the driver. This provides a favorable viewing angle for reading the various displays 22, 24 and 26.

In use, the one-piece radar unit of the present invention is quickly installed by placing the bracket plate 12 in the desired position on the dashboard 18 and securing the unit in place with the suction cups 46 and the defroster vent ties. Typically, electric power will be obtained from the cigarette lighter provided on the vehicle. The reflector 14 is rotated to the selected position to transmit the radar signal in the desired horizontal direction; likewise, Doppler return signals are received along the same path. For moving radar applications, a mark 102 centered on the reflector 14 is provided for alignment with three index marks 98, 99 and 100 on the top wall 16 of the housing so as to indicate the center position (beaming straight ahead) of the reflector 14 as shown in FIG. 4 where marks 98 and 102 are aligned, five degrees to the left as illustrated in FIG. 2 where marks 99 and 102 are aligned, or ten degrees to the left when marks 100 and 102 are brought into alignment (not shown). The five degree position indication is provided for the convenience of the operator since it is the average position of the reflector 14 in moving radar applications where the opposite lane of the highway is under surveillance.

The credibility of moving radar has been questioned in connection with speed law enforcement on the highways, due to the error in patrol car speed that can be introduced in a Doppler radar system by a background target which is laterally displaced from the direction of movement of the patrol vehicle. Such theoretical error is a function of the cosine of the angle formed by the direction of the radar beam and the fore-and-aft axis (direction of movement) of the patrol vehicle. The cosine error is negligible at the five degree position of reflector 14 illustrated in FIG. 2; accordingly, this position is recommended in enforcement applications where the accuracy of the radar in determining the speed of a violator cannot be subject to question. The error is still very small (approximately one percent) at ten degrees. Therefore, the ten degree position denoted by mark 100 is provided as a suggested maximum angle.

It should be understood that the bracket plate 12 is of a size and shape to adapt it to a particular model car so that, when installed, the center position of the reflector 14 (marks 98 and 102 aligned as in FIG. 4) will aim the transmitted radar beam straight ahead either along or parallel to the fore-and-aft axis of the vehicle. This permits the unit to be transferred from car to car of like model with assurance that the alignment will be correct.

In addition to allowing 360° rotation of the reflector 14, the ring 82, band 90 and tabs 95 provide a snap-out safety mount for the reflector 14 in the event that the reflector is struck by the driver or an occupant of the vehicle as a result of an accident or an avoidance maneuver by the patrol vehicle. The band 90 is formed from wire stock of sufficient resiliency to permit the band to snap into place seated within the circumferential groove 88 of the ring 82. Accordingly, depending upon the wire size and material selected for the band 90, the band will become unseated and separate from the ring 82 in response to a generally horizontally directed force applied to the reflector 14, such as would occur upon impact of a portion of a person's body with the reflector 14. Accordingly, the safety mount permits the reflector 14 to break away from the housing 10 under impact to minimize any hazard that might be presented by the presence of the reflector.

Having thus described the invention, what is claimed as new and desired to be secured by Letters Patent is:

1. A one-piece traffic radar unit comprising:
   a housing having a top and containing Doppler radar apparatus capable of generating a microwave radar signal and processing return signals to provide an output that indicates the speed of a target vehicle;
   a boom secured to said housing adjacent said top and extending therefrom for mounting the housing in a patrol vehicle to install the radar unit therein said boom being adapted to overlie the dashboard of the patrol vehicle with the housing depending from the boom in front of the dashboard;
   means for securing said boom to said patrol vehicle on said dashboard thereof;
   a directional antenna device connected with said apparatus for transmitting said radar signal and receiving said return signals, and mounted in said housing in a disposition to beam the transmitted signal along an upwardly extending path through said top of the housing; and
   a reflector mounted on said top in said path for redirecting said transmitted signal along a generally horizontal path, whereby to beam the transmitted signal and receive the return signals through the windshield or a window of a patrol vehicle in which the unit is installed.

2. The radar unit as claimed in claim 1, wherein said boom comprises a generally horizontally disposed bracket plate adapted to be superposed on said dashboard, whereby the driver's view through the windshield is unobstructed.

3. The radar unit as claimed in claim 1, further comprising means mounting said reflector on said top of the housing for rotation about an upright axis to a selected position in which the transmitted signal is redirected in a desired direction.

4. The radar unit as claimed in claim 3, wherein said antenna device is disposed in said housing so that said upwardly extending path is substantially vertical, said reflector having a reflecting surface at an inclination to cause a right-angle reflection of said transmitted signal and return signals.

5. The radar unit as claimed in claim 3, wherein said antenna device comprises a conical antenna having a horn coaxial with said axis of rotation of the reflector.

6. The radar unit as claimed in claim 5, wherein said housing has a major portion thereof depending from said boom, said conical antenna being mounted in said portion.

7. The radar unit as claimed in claim 5, wherein said top of the housing has an opening therein, said horn registering with said opening, said reflector having a reflecting surface extending over said opening thereabove.

8. The radar unit as claimed in claim 7, wherein said mounting means includes a ring on said top concentric with said horn, said ring and said reflector having inter-engaging parts providing a continuous track for rotation of said reflector about said axis.

9. The radar unit as claimed in claim 7, wherein said mounting means includes a ring on said top concentric with said horn and having a circumferential groove therein, and a yieldable band attached to said reflector and seated in said groove for sliding movement around the ring as the reflector is rotated, said band being sufficiently yieldable to become unseated and separate from said ring if said reflector is struck with a force of predetermined magnitude, whereby to provide a snap-out safety mount for said reflector.

10. The radar unit as claimed in claim 1, further comprising means releasably mounting said reflector on said top of the housing for rotation about an upright axis to a selected position in which the transmitted signal is redirected in a desired direction, and permitting said reflector to break away from the housing under impact.

11. The radar unit as claimed in claim 1, wherein said boom has a longitudinal axis extending generally fore-and-aft with respect to a patrol vehicle in which the unit is installed, said housing having a front control panel lying essentially in an upright plane extending horizontally obliquely of said axis at an angle to face said panel generally toward the driver of the vehicle.

12. The radar unit as claimed in claim 1, further comprising means mounting said reflector on said top of the housing for rotation about an upright axis to any one of a number of positions in which the transmitted signal is redirected generally horizontally, said reflector having a center mark thereon and there being indicia means on said top for alignment with said mark to indicate the center position of the reflector and at least one additional selectable position used in moving radar applications, said boom comprising a generally horizontally disposed bracket plate adapted to be superposed on said dashboard and constructed and arranged to fit the patrol vehicle such that the reflector, in said center position thereof, will beam the transmitted signal straight ahead through the windshield.

* * * * *